July 24, 1923.
M. ADENOT
VEHICLE BRAKE
Filed Feb. 9, 1921
1,463,112
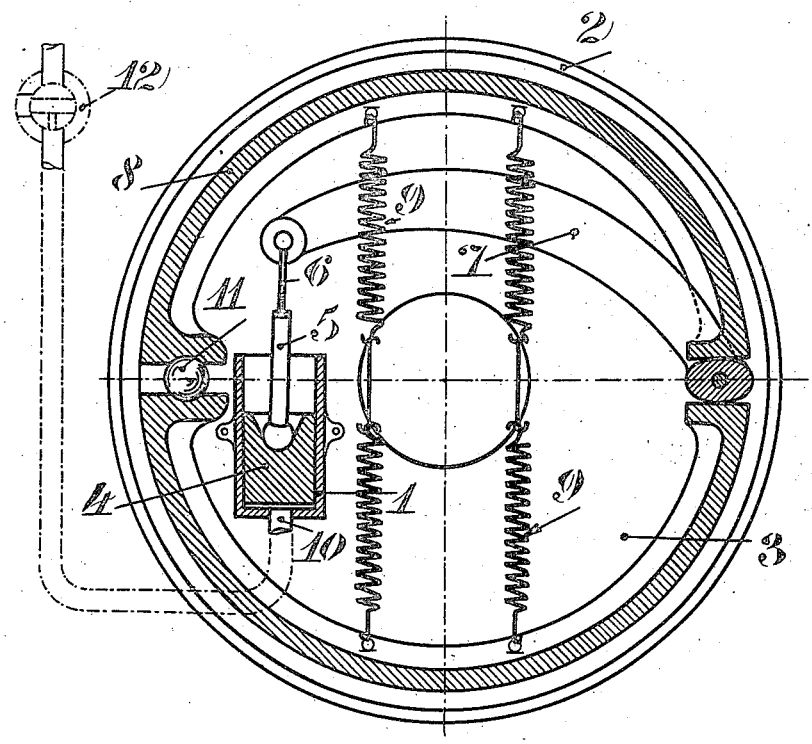
Witnesses
Inventor
Marius Adenot,
by Henry T. Bright
Atty.

Patented July 24, 1923.

1,463,112

UNITED STATES PATENT OFFICE.

MARIUS ADENOT, OF CALUIRE, FRANCE, ASSIGNOR TO SOCIÉTÉ LYONNAISE D'INDUSTRIE MÉCANIQUE, OF CALUIRE, RHONE, FRANCE, A CORPORATION OF FRANCE.

VEHICLE BRAKE.

Application filed February 9, 1921. Serial No. 443,679.

*To all whom it may concern:*

Be it known that I, MARIUS ADENOT, of Caluire, Rhone, France, a citizen of the French Republic, have invented certain new and useful Improvements in Vehicle Brakes, of which the following is a specification.

The object of this invention is to provide a pneumatic brake, which can be disposed conveniently within the wheel of a vehicle, and is in particular well adapted for braking the front wheels of a motor vehicle, in that it requires for its actuation merely a supply of compressed air to a cylinder within the wheel which can be effected through a flexible tube.

An embodiment of the invention is shown in vertical section in the accompanying drawing.

In the drawing, 1 designates a cylinder, carried within the drum 2 upon a fixed supporting plate 3, and having in it a plunger 4 connected by means of a loose ball and socket joint to a rod 5, which is in turn connected by a screwed, adjustable rod 6 to a cam lever 7. The latter engages between the free ends of two approximately semi-circular brake shoes 8 which are drawn towards each other, into the inoperative position, by springs 9, and are fulcrummed upon a ball 11. A tube 10 connects the cylinder to a three-way valve 12, whereby compressed air from a convenient reservoir can be admitted to the cylinder and discharged therefrom.

When the valve 12 is set for admitting air to the cylinder, the plunger 4 is lifted and actuates the cam lever, which rocks the brake shoes apart and applies them to the drum. When the valve is set for the discharge of the air, the springs 9 retract the brake shoes, and thus also restore the plunger to its inoperative position.

What I claim as my invention and desire to secure by Letters Patent of the United States is:—

In a vehicle brake the combination of a rotatable drum, a non-rotatable support within said drum, a pneumatic cylinder carried by said support open at one end, a plunger in said cylinder having a socket, two approximately semi-circular brake shoes fulcrumed upon said support close to said cylinder and adapted to coact with said drum, a cam lever engaging between the free ends of said brake shoes, adapted to rock same apart for engaging the drum, a rod having one end connected to said cam lever and having at the other end a ball engaging the socket in said plunger, and springs for retracting the brake shoes from the drum, the open end of the cylinder leaving a clearance around said rod, whereby said rod is enabled to rock.

In witness whereof I have signed this specification in the presence of two witnesses.

MARIUS ADENOT.

Witnesses:
  JULIAN DEMBLE SWEDBERG,
  JEAN FERNEAUD.